US012678726B2

(12) United States Patent (10) Patent No.: US 12,678,726 B2
Lin et al. (45) Date of Patent: Jul. 14, 2026

(54) METHOD FOR CLEAN AND LOW-CARBON IN-SITU DISPOSAL OF WASTE INCINERATION FLY ASH

(71) Applicant: Zhejiang University, Hangzhou (CN)

(72) Inventors: Xiaoqing Lin, Hangzhou (CN); Jie Chen, Hangzhou (CN); Hong Yu, Hangzhou (CN); Xiaodong Li, Hangzhou (CN); Jianhua Yan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 475 days.

(21) Appl. No.: 18/386,310

(22) Filed: Nov. 2, 2023

(65) Prior Publication Data

US 2024/0149207 A1 May 9, 2024

(30) Foreign Application Priority Data

Nov. 7, 2022 (CN) .......................... 202211387792.3

(51) Int. Cl.
| | |
|---|---|
| B01D 50/60 | (2022.01) |
| B01D 1/26 | (2006.01) |
| B01D 46/02 | (2006.01) |
| B01D 53/04 | (2006.01) |
| C02F 1/00 | (2023.01) |

(Continued)

(52) U.S. Cl.
CPC .............. B01D 50/60 (2022.01); B01D 1/26 (2013.01); B01D 46/02 (2013.01); B01D 53/04 (2013.01); C02F 1/004 (2013.01); C02F 1/04 (2013.01); C02F 1/66 (2013.01); C04B 7/26 (2013.01); F23J 15/025 (2013.01); B01D

*2253/102* (2013.01); *B01D 2257/70* (2013.01); *B01D 2258/0291* (2013.01); *F23G 5/00* (2013.01);

(Continued)

(58) Field of Classification Search
CPC ...... F23J 2217/101; F23J 15/025; F23J 15/02; C04B 2290/20; C04B 7/4407; F23G 2206/20; Y02E 20/12; Y02W 30/20; B09B 2101/30; C22B 7/02; B07B 11/04
USPC ........................................................ 588/406
See application file for complete search history.

(56) References Cited

FOREIGN PATENT DOCUMENTS

| | | | | |
|---|---|---|---|---|
| CN | 105148657 A | * | 12/2015 | |
| CN | 112139200 A | * | 12/2020 | .............. B09B 3/40 |
| CN | 114992630 A | | 9/2022 | |

OTHER PUBLICATIONS

Machine translation of CN 105148657 A (Year: 2015).*
Machine translation of CN 112139200 A (Year: 2020).*

* cited by examiner

*Primary Examiner* — Coris Fung
*Assistant Examiner* — Remy Frederic Lalisse

(57) ABSTRACT

A system and method for clean and low-carbon in-situ disposal of waste incineration fly ash includes a waste incineration system and a fly ash disposal system. The fly ash disposal system includes a water washing system, an MVR system, and a dioxin removal system. The water washing system includes a water washing device and a press filtering device. The dioxin removal system includes a heating device, an activated carbon adsorption device, and a heat pump system. The MVR system includes a crystallizer, a heater, a vapor compressor, and other equipment. The waste incineration system is coupled with the fly ash disposal system nearby to achieve in-situ disposal of fly ash, avoiding the logistics cost and secondary pollution problems (Continued)

of long-distance transportation of fly ash, and greatly reducing energy and water resource consumption.

9 Claims, 3 Drawing Sheets

(51) Int. Cl.
    *C02F 1/04*           (2023.01)
    *C02F 1/66*           (2023.01)
    *C04B 7/26*           (2006.01)
    *F23J 15/02*        (2006.01)
    *F23G 5/00*        (2006.01)
(52) U.S. Cl.
    CPC ..... *F23G 2206/20* (2013.01); *F23J 2217/101*
                                     (2013.01)

METHOD FOR CLEAN AND LOW-CARBON IN-SITU DISPOSAL OF WASTE INCINERATION FLY ASH

CROSS REFERENCE TO RELATED APPLICATIONS

The present application claims the benefit of Chinese Patent Application No. 202211387792.3 filed on Nov. 7, 2022, the contents of which are incorporated herein by reference in their entirety.

TECHNICAL FIELD

The present application relates to a solid waste treatment technology, and particularly relates to in-situ disposal and resource utilization of municipal solid waste incineration fly ash.

BACKGROUND

Municipal solid waste incineration technology has become the mainstream technology for harmless waste treatment, waste incineration can not only effectively sterilize, reduce capacity, and reduce quantity, but also generate a large amount of heat and electricity, providing power and heat for urban development, and maximizing the energy utilization of waste. However, due to the complex composition of municipal solid waste, the flue gas during the combustion process is rich in a large number of chloride salts, heavy metals, and dioxins. In order to prevent these toxic and harmful substances from being discharged into the atmosphere, it is necessary to spray a large amount of quicklime, activated carbon, etc. into a flue gas purification system to adsorb these toxic and harmful substances, and collect fly ash through a bag dust collector. Therefore, the fly ash rich in a large number of toxic and harmful substances such as chloride salts, heavy metals, and dioxins is listed in the "Directory of National Hazardous Wastes".

The existing fly ash disposal technologies are mainly divided into thermal disposal and non-thermal disposal. The thermal disposal technologies include high-temperature melting, sintering, and low-temperature disposal. High-temperature melting and sintering can effectively degrade dioxins and solidify heavy metals, but high temperature can easily lead to secondary pollution caused by the volatilization of heavy metals, and the energy consumption cost is high. At present, low-temperature disposal is widely used in dioxin thermal desorption and activated carbon adsorption technologies. However, this technology essentially transfers dioxins to activated carbon, the activated carbon still requires appropriate treatment, and heavy metals have not been effectively solidified. Non-thermal disposal technologies include cement solidification, chemical stabilization, mechanochemical methods, etc. The cement solidification and chemical stabilization combined with sanitary landfill are currently the mainstream methods for fly ash disposal in China. However, dioxins have not been disposed, and there are problems such as increased capacity and long-term risk of heavy metal leaching.

In addition to hazardous properties, waste incineration fly ash also has resource properties. Because it is rich in a large number of chloride salts and potassium salts, as well as calcium oxide, silicon dioxide, aluminum oxide, etc., direct landfill is also a waste of resources. Relevant studies have shown that fly ash can be washed with water to remove a large number of chloride salts, and sodium chloride and potassium chloride can be evaporated and crystallized for recovery through a mechanical vapor recompression technology. The remaining fly ash washed with water can be treated with heavy metal solidification and dioxin removal to achieve harmless and resourceful disposal of fly ash. However, the above technologies have the problem of high energy consumption. In order to reduce energy consumption costs, the Chinese invention patent "Circulating System for Integrating Waste Incineration Fly Ash Disposal and Coal Gasification Power Generation" (CN 202210391773.1) introduces a method of coupling fly ash disposal with coal gasification power generation and decomposing dioxins through the heat generated by high-temperature combustion of coal powder to achieve solidification of heavy metals in fly ash. This method achieves the disposal of both dioxins and heavy metals, reducing the energy consumption cost of disposal of fly ash, however, it is prone to secondary fly ash pollution, and chloride salts in fly ash have not been recovered as resources. During the combustion process of coal powder, a large amount of carbon dioxide is emitted, and the addition of fly ash greatly affects the stable combustion of coal powder, which not only increases the consumption of non-renewable energy, but also increases carbon emission. In addition, the disposal sites of the existing fly ash disposal process routes are far away from waste incineration plants, which is prone to high transportation costs and secondary pollution problems such as leakage during the transportation process.

In view of the above situation, there is an urgent need for a method for clean and low-carbon in-situ disposal of waste incineration fly ash, which can not only achieve in-situ disposal of fly ash and reduction of transportation costs and secondary pollution, but also achieve in-situ energy supply, energy conservation and consumption reduction, and improve the utilization rate of fly ash resources.

SUMMARY

The technical problems to be solved by the present application are to overcome the shortcomings of existing technologies and provide a system and method for clean and low-carbon in-situ disposal of waste incineration fly ash.

To solve the technical problems, the scheme of the present application is as follows:

A system for clean and low-carbon in-situ disposal of waste incineration fly ash is provided, the system including a waste incineration system and a fly ash disposal system, where the fly ash disposal system includes a water washing system, a mechanical vapor recompression (MVR) system, and a dioxin removal system;

the waste incineration system includes a waste incinerator, a flue gas purification system, a bag dust collector, and a chimney connected sequentially by a flue; heat exchange equipment is arranged in the flue for recovering heat energy from the flue gas; a waste activated carbon adding port is arranged at a front end of the waste incinerator, an original fly ash outlet is arranged at a bottom of the bag dust collector, and a hot flue gas outlet is arranged at a lower middle part of the chimney;

the water washing system includes a water washing device and a press filtering device; the water washing device is provided with an original fly ash inlet, a cold flue gas inlet, a tail gas outlet, a sodium carbonate adding port, and a condensed water inlet; the water washing device is connected to the press filtering device, and the latter is provided with a water washing fly ash outlet and a cold water washing solution outlet;

the dioxin removal system includes a heating device, an activated carbon adsorption device, and a heat pump system; the heating device is provided with an air and nitrogen inlet, a water washing fly ash inlet, a wet tail gas outlet, a to-be-desorbed tail gas outlet, and a treated fly ash outlet, and the to-be-desorbed tail gas outlet is connected to the activated carbon adsorption device; the activated carbon adsorption device is internally filled with activated carbon and is provided with a waste activated carbon discharge outlet and a thermal desorption tail gas outlet; the heat pump system is configured to provide heat to the heating device and is provided with a hot flue gas inlet and a cold flue gas outlet, and the wet tail gas outlet of the heating device is connected to the hot flue gas inlet;

the mechanical vapor recompression system includes a crystallizer, a heater, a vapor compressor, a circulating pump, a centrifuge, and a condensed water pump, and is provided with a hot water washing solution inlet, a condensed water discharge outlet, and a salt crystal outlet;

the above-mentioned systems are connected in the following modes:

the original fly ash outlet of the bag dust collector is connected to the original fly ash inlet of the water washing device through a conveying channel, the water washing fly ash outlet of the press filtering device is connected to the water washing fly ash inlet of the heating device through a conveying channel, and the waste activated carbon discharge outlet of the activated carbon adsorption device is connected to the waste activated carbon adding port of the waste incinerator through a conveying channel; the hot flue gas outlet of the chimney is connected to the hot flue gas inlet of the heat pump system through a pipeline, and the cold flue gas outlet of the heat pump system is connected to the cold flue gas inlet of the water washing device through a pipeline; the cold water washing solution outlet of the water washing device is connected to heat exchange equipment in the flue through a pipeline, the heat exchange equipment is connected to the hot water washing solution inlet of the mechanical vapor recompression system through a pipeline after heat exchange; the condensed water discharge outlet of the mechanical vapor recompression system is connected to the condensed water inlet of the water washing system through a pipeline.

As a preferred scheme of the present application, the waste incineration system is located in a waste incineration power plant, the heat exchange equipment in the flue is connected to a steam turbine through a steam pipeline, the latter is connected to a generator set; and the generator set is connected to electrical equipment in the fly ash disposal system through a cable, and uses the self-generation of the waste incineration power plant to achieve power supply.

As a preferred scheme of the present application, the heat pump system is further provided with the condensed water discharge outlet, and the condensed water discharge outlet is connected to the cold water washing solution outlet of the water washing device through a pipeline.

As a preferred scheme of the present application, the chimney is provided with a partition device that can adjust an opening degree, and the hot flue gas outlet is located below the partition device; a thermal desorption tail gas inlet is arranged above the partition device, and is connected to the thermal desorption tail gas outlet of the activated carbon adsorption device through a pipeline for achieving clean tail gas emission.

As a preferred scheme of the present application, the heat exchange equipment is at least one of a superheater, an economizer, or an air preheater; and a water washing solution preheating device is arranged inside the heat exchange equipment, and is separately connected to the cold water washing solution outlet of the water washing device and the hot water washing solution inlet of the mechanical vapor recompression system through pipelines.

As a preferred scheme of the present application, the condensed water discharge outlet of the mechanical vapor recompression system is also connected to a condensed water discharge pipeline.

The present application further provides a method for clean and low-carbon in-situ disposal of waste incineration fly ash, where the fly ash disposal system is coupled with the waste incineration system of the waste incineration power plant in-situ, the fly ash and the flue gas are disposed nearby, and flue gas residual heat and self-generated electricity of the waste incineration power plant are used for providing energy demand and in-situ energy supply for fly ash disposal;

the method specifically includes:

(1) sending original fly ash collected by the bag dust collector to the water washing device of the water washing system, and introducing cold flue gas that has been heat exchanged by the heat pump system, where alkaline substances and heavy metals in the fly ash undergo carbonation reaction with carbon dioxide in the flue gas; when a pH value of a water washing solution is less than 7, stopping introducing the flue gas and adding sodium carbonate to adjust the pH value to between 9 and 10; and the cold flue gas is directly discharged from the tail gas outlet after the carbonation reaction;

(2) sending a suspension obtained by water washing to the press filtering device for press filtration operation to achieve solid-liquid separation, where the water washing solution is sent to the heat exchange equipment of the waste incineration system for preheating, and the solid fly ash washed with water is sent to the heating device of the dioxin removal system for dioxin removal treatment;

(3) enabling the pre-heated water washing solution having a temperature of 70-80° C. to enter the mechanical vapor recompression system and undergo multi-effect staged evaporation to obtain salt crystals and condensed water, where the salt crystals are recycled for resource utilization, while the condensed water is sent to the water washing device for fly ash washing; and (4) enabling the fly ash washed with water to undergo two treatment stages of drying and thermal desorption in the dioxin removal system, where during the drying stage, a temperature in the heating device is controlled at 100-110° C. for 10-12 hours; at this time, the heat pump system introduces hot flue gas from the chimney and achieves heat supply by recovering sensible heat and latent heat contained in the flue gas; meanwhile, wet tail gas generated during the drying process is sent to the heat pump system by blowing in air to further recover latent heat of water vapor; the treated wet tail gas is sent to the inlet of the heat pump system, and mixed with the hot flue gas for heat supply;

during the drying stage, the temperature in the heating device is controlled at 200-350° C. for 1-2 hours; at this time, the thermal desorption tail gas generated during the drying process is sent to the activated carbon adsorption device by blowing in nitrogen, dioxins contained in the tail gas are adsorbed by activated carbon; the waste activated carbon generated by adsorption is sent to a feed adding inlet of the waste incinerator for high-temperature degradation of the dioxins through combustion; the tail gas after thermal desorption disposal is sent to an upper part of the chimney to achieve clean emission; and the fly ash after thermal desorption disposal is discharged from a bottom of the heating device for further resource utilization.

As a preferred scheme of the present application, the condensed water generated by the heat pump system during the heat exchange process is sent to the water washing device for recycling as the water washing solution.

As a preferred scheme of the present application, the flow of the flue gas entering the fly ash disposal system is controlled by adjusting the opening degree of the partition device in the chimney according to operating conditions of the heat pump system and the water washing system, and excess flue gas is discharged from the chimney.

As a preferred scheme of the present application, the generator set of the waste incineration power plant is configured to power the electrical equipment in the fly ash disposal system.

DESCRIPTION OF PRINCIPLES OF THE PRESENT APPLICATION

In the present application, the waste incineration system is coupled with the fly ash disposal system nearby to achieve in-situ disposal of fly ash, avoiding the logistics cost and secondary pollution problems of long-distance transportation of fly ash. The present application can greatly reduce energy and water resource consumption. By efficiently capturing and storing carbon dioxide emitted by waste incineration plants, efficient dechlorination of fly ash, solidification of heavy metals, removal and degradation of dioxins, and recovery of chloride salts can be achieved, thereby achieving resource utilization of fly ash.

The main technical principles of the present application are as follows:

(I) Energy Saving and Environmental Friendliness:

(1) The fly ash disposal system is arranged in (or adjacent to) the waste incineration power plant, and the required electricity is directly supplied by the power plant, reducing losses during the power transmission process and avoiding logistics costs and secondary pollution problems of long-distance transportation of fly ash.

(2) By introducing the water washing solution from the water washing system into the heat exchange equipment (such as the economizer) for heat exchange, the water washing solution rises from room temperature to 70-80° C. before entering the MVR system. At this time, the MVR system only needs to heat the water washing solution from 70-80° C. to the evaporation crystallization temperature, greatly reducing the electricity consumption of the compressor.

(3) By using the heat pump system as a heat source for the dioxin removal system, in addition to recovering the sensible heat and latent heat of the flue gas discharged from the chimney, the heat pump system also recovers a large amount of saturated wet steam residual heat discharged from the dry fly ash washed with water. Moreover, activated carbon that adsorbs a large amount of dioxins has high calorific value characteristics, and sending it into the waste incinerator can promote combustion.

(4) The condensed water obtained from the MVR system and the heat pump system is recovered as a water source for fly ash washing, which can minimize the consumption of water resources.

(II) Pollution Reduction and Carbon Reduction:

(1) Water washing system: The cold dry flue gas discharged from the heat pump system is introduced into the water washing solution, and the alkaline substances calcium hydroxide and heavy metals in the fly ash undergo carbonation reaction with carbon dioxide in the flue gas, the generated calcium carbonate has a good encapsulation and adsorption effect on heavy metals. The free states of heavy metals such as Pb, Zn, Cu, and Ni are converted into stable states of carbonate salts, which effectively solidify heavy metals in fly ash under the dual solidification effect. Meanwhile, the carbonation process can have a deep dechlorination effect on fly ash, insoluble chloride salts (Friedel salts) in fly ash are converted into soluble salts. The water washing system is arranged at the front end of the dioxin removal system, effectively avoiding the risk of dioxin re-synthesis during the thermal desorption stage of dioxins due to the presence of a large amount of chlorine in fly ash.

(2) Dioxin removal system: Firstly, during the drying stage, the temperature is controlled at 100-110° C. and air is blown in. In this environment, dioxins in fly ash are very stable and do not undergo thermal desorption, achieving the effect of only evaporating the moisture in fly ash washed with water. Secondly, in the thermal desorption stage, the temperature is controlled at 200-350° C. and nitrogen is blown in. In this environment, dioxins in fly ash have efficient dissociation and desorption effects, and enter the activated carbon adsorption device with the airflow. The activated carbon has a strong adsorption effect on dioxins with a removal efficiency of 99% or above in the tail gas. Finally, the activated carbon with a large number of dioxins adsorbed is sent to the waste incinerator for incineration, reducing the cost of transporting of the activated carbon and disposal of organic pollutants. Meanwhile, dioxins can be completely decomposed in a high temperature environment (the flue gas temperature is greater than 850° C. for 2 seconds), and the activated carbon as a high calorific value substance does not add any burden to the combustion of the waste incinerator.

Compared with the Prior Art, the Present Application has the Following Beneficial Technical Effects (1) The present application avoids the transportation logistics cost and pollution risk of waste incineration fly ash by in-situ disposal, and the electric energy emitted by the waste incineration power plant is directly supplied to the fly ash disposal system for operation.

(2) The present application utilizes the heat pump system to recover the residual heat of the hot flue gas discharged from the chimney and provide heat to the dioxin removal system, greatly reducing energy consumption.

(3) The present application utilizes the heat of the heat exchange equipment such as economizers to preheat the water washing solution, which can greatly improve the evaporation crystallization efficiency of the MVR system and reduce energy consumption.

(4) In the present application, the cold flue gas after the heat pump system recovers the residual heat is introduced into the water washing system, which plays an effective role in the storage of carbon dioxide and the efficient solidification and dechlorination of heavy metals.

(5) The circulating use of the condensed water in the MVR system and the heat pump system greatly reduces water resource consumption and almost has no need for additional water sources.

(6) The dual purpose of the dioxin removal system achieves both drying of the fly ash washed with water and dioxin removal by changing temperature and gas flow direction.

(7) The activated carbon is directly fed into the incinerator, reducing the disposal cost of the activated carbon and the organic pollutants, providing high calorific value activated carbon and degrading dioxins.

(8) The chlorine content of the treated fly ash is less than 1%, and the heavy metal leaching toxicity and dioxin content meet the HJ/T 1134 standard for resource utilization.

(9) The whole set of the fly ash disposal system has reduced the cost of the fly ash disposal in the waste incineration plants by 30%-50% or more.

DETAILED DESCRIPTION

According to a system and method for clean and low-carbon in-situ disposal of waste incineration fly ash provided in the present application, the waste incineration fly ash disposal system is coupled with the waste incineration system, firstly the logistics cost and secondary pollution problems of long-distance transportation of fly ash are avoided, and secondly, the low-grade residual heat and electricity from a waste incineration power plant can provide energy demand for the fly ash disposal equipment to achieve in-situ energy supply. In addition, the high-temperature environment of the incinerator can be configured to degrade dioxins adsorbed on activated carbon at high temperature, reducing the cost of transporting of the activated carbon and disposal of organic pollutants. Carbon dioxide emitted by the waste incineration power plant is efficiently captured and stored by utilizing the unique high alkali properties of fly ash, and heavy metals in the fly ash are efficiently solidified. The present application in-situ disposes pollutants such as dioxins and heavy metals in the fly ash, providing important support for its resource utilization. The in-situ disposal process of the fly ash is clean, low-carbon, energy-saving, and environmentally friendly.

The present application will be further described in conjunction with the accompanying drawings and specific embodiments.

Figure 1:
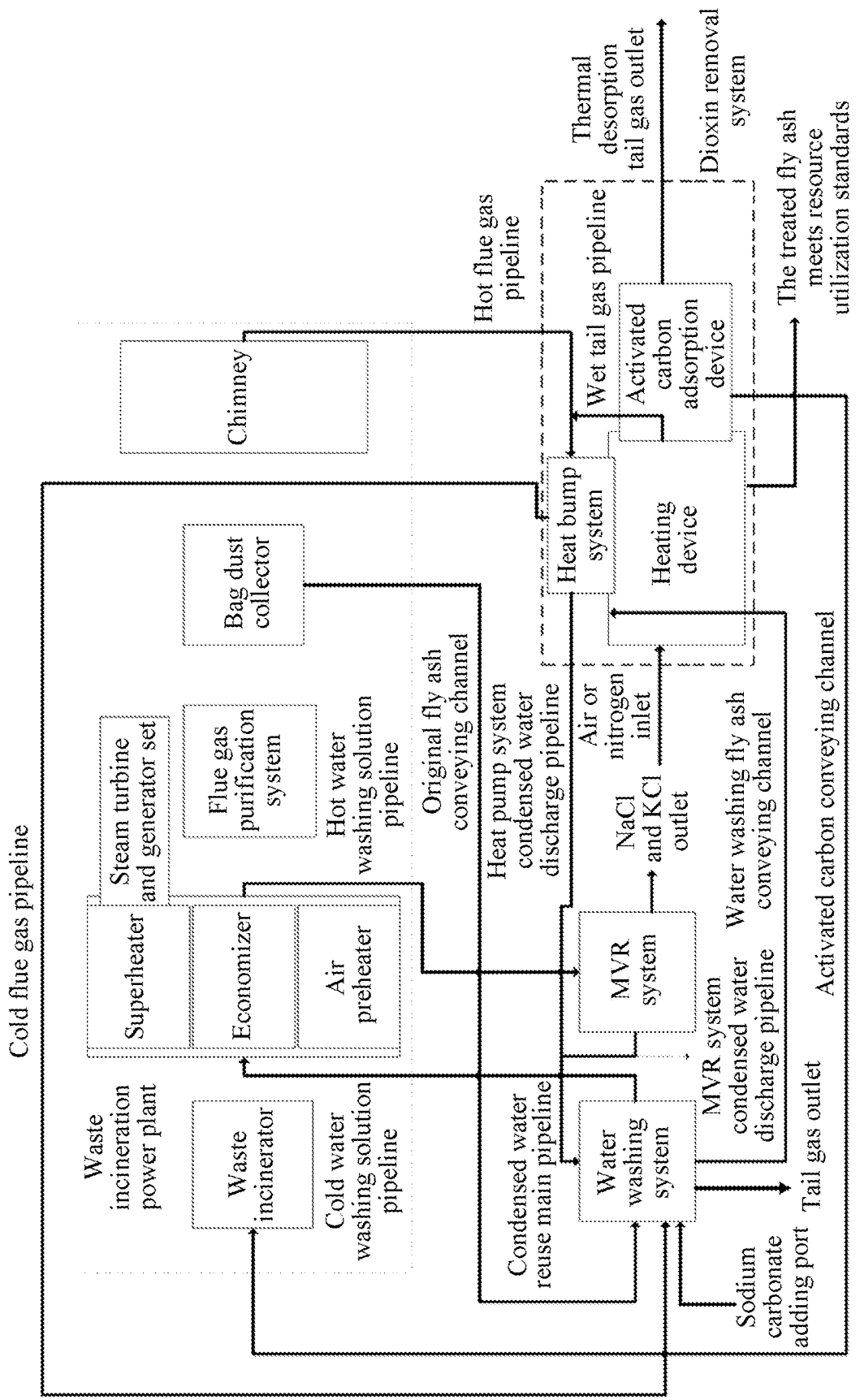
FIG. 1 is a process flowchart of the present application.

As shown in FIG. 1, a system for clean and low-carbon in-situ disposal of waste incineration fly ash in the present application includes a waste incineration system and a fly ash disposal system. The fly ash disposal system includes a water washing system, a mechanical vapor recompression system, and a dioxin removal system. The waste incineration system is located in a waste incineration power plant, the heat exchange equipment in the flue is connected to a steam turbine through a steam pipeline, and the latter is connected to a generator set. The generator set is connected to electrical equipment in the fly ash disposal system through a cable, and uses the self-generation of the waste incineration power plant to achieve power supply.

The waste incineration system includes a waste incinerator, a flue gas purification system, a bag dust collector, and a chimney connected sequentially by a flue. Heat exchange equipment is arranged in the flue for recovering heat energy from the flue gas. A waste activated carbon adding port is arranged at a front end of the waste incinerator. An original fly ash outlet is arranged at a bottom of the bag dust collector. A hot flue gas outlet is arranged at a lower middle part of the chimney.

The water washing system includes a water washing device and a press filtering device. The water washing device is provided with an original fly ash inlet, a cold flue gas inlet, a tail gas outlet, a sodium carbonate adding port, and a condensed water inlet. The water washing device is connected to the press filtering device, and the latter is provided with a water washing fly ash outlet and a cold water washing solution outlet.

The dioxin removal system includes a heating device, an activated carbon adsorption device, and a heat pump system. The heating device is provided with an air and nitrogen inlet, a water washing fly ash inlet, a wet tail gas outlet, a to-be-desorbed tail gas outlet, and a treated fly ash outlet. The to-be-desorbed tail gas outlet is connected to the activated carbon adsorption device. The activated carbon adsorption device is internally filled with activated carbon and is provided with a waste activated carbon discharge outlet and a thermal desorption tail gas outlet. The heat pump system is configured to provide heat to the heating device and is provided with a hot flue gas inlet and a cold flue gas outlet. The wet tail gas outlet of the heating device is connected to the hot flue gas inlet.

The mechanical vapor recompression system includes a crystallizer, a heater, a vapor compressor, a circulating pump, a centrifuge, and a condensed water pump, and is provided with a hot water washing solution inlet, a condensed water discharge outlet, and a salt crystal outlet.

The above-mentioned systems are connected in the following modes:

The original fly ash outlet of the bag dust collector is connected to the original fly ash inlet of the water washing device through a conveying channel. The water washing fly ash outlet of the press filtering device is connected to the water washing fly ash inlet of the heating device through a conveying channel. The waste activated carbon discharge outlet of the activated carbon adsorption device is connected to the waste activated carbon adding port of the waste incinerator through a conveying channel. The hot flue gas outlet of the chimney is connected to the hot flue gas inlet of the heat pump system through a pipeline. The cold flue gas outlet of the heat pump system is connected to the cold flue gas inlet of the water washing device through a pipeline. The cold flue gas after carbonation reaction is directly discharged from the tail gas outlet. The cold water washing solution outlet of the water washing device is connected to heat exchange equipment in the flue through a pipeline. The heat exchange equipment is connected to the hot water washing solution inlet of the mechanical vapor recompression system through a pipeline after heat exchange. The condensed water discharge outlet of the mechanical vapor recompression system is connected to the condensed water inlet of the water washing system through a pipeline.

In addition, as a further preferred scheme of the present application, the condensed water discharge outlet of the mechanical vapor recompression system is also connected to a condensed water discharge pipeline. The heat pump system is further provided with the condensed water discharge outlet, and the condensed water discharge outlet is connected to the cold water washing solution outlet of the water washing device through a pipeline. The chimney is provided with a partition device that can adjust an opening degree, and the hot flue gas outlet is located below the partition device. A thermal desorption tail gas inlet is arranged above the partition device, and is connected to the thermal desorption tail gas outlet of the activated carbon adsorption device through a pipeline for achieving clean tail gas emission. The heat exchange equipment is optionally at least one of a superheater, an economizer, or an air preheater. A water washing solution preheating device is arranged inside the heat exchange equipment, and is separately connected to the cold water washing solution outlet of the water washing device and the hot water washing solution inlet of the mechanical vapor recompression system through pipelines.

Based on above-mentioned system, the present application provides a method for clean and low-carbon in-situ disposal of waste incineration fly ash. The fly ash disposal system is coupled with the waste incineration system of the waste incineration power plant in-situ. The fly ash and the flue gas are disposed nearby. Flue gas residual heat and self-generated electricity of the waste incineration power plant are used for providing energy demand and in-situ energy supply for fly ash disposal.

The method specifically includes:

(1) sending original fly ash collected by the bag dust collector to the water washing device of the water washing system, and introducing cold flue gas that has been heat exchanged by the heat pump system, wherein alkaline substances and heavy metals in the fly ash undergo carbonation reaction with carbon dioxide in the flue gas; when a pH value of a water washing solution is less than 7, stopping introducing the flue gas and adding sodium carbonate to adjust the pH value to between 9 and 10; and the cold flue gas is directly discharged from the tail gas outlet after the carbonation reaction;

(2) sending a suspension obtained by water washing to the press filtering device for press filtration operation to achieve solid-liquid separation, where the water washing solution is sent to the heat exchange equipment of the waste incineration system for preheating, and the solid fly ash washed with water is sent to the heating device of the dioxin removal system for dioxin removal treatment;

(3) enabling the pre-heated water washing solution having a temperature of 70-80° C. to enter the mechanical vapor recompression system and undergo multi-effect staged evaporation to obtain salt crystals and condensed water, where the former is recycled for resource utilization, while the latter is sent to the water washing device for fly ash washing; and (4) enabling the fly ash washed with water to undergo two treatment stages of drying and thermal desorption in the dioxin removal system, where during the drying stage, a temperature in the heating device is controlled at 100-110° C. for 10-12 hours; at this time, the heat pump system introduces hot flue gas from the chimney and achieves heat supply by recovering sensible heat and latent heat contained in the flue gas; meanwhile, wet tail gas generated during the drying process is sent to the heat pump system by blowing in air to further recover latent heat of water vapor; the treated wet tail gas is sent to the inlet of the heat pump system, and mixed with the hot flue gas for heat supply;

during the drying stage, the temperature in the heating device is controlled at 200-350° C. for 1-2 hours; at this time, the thermal desorption tail gas generated during the drying process is sent to the activated carbon adsorption device by blowing in nitrogen, dioxins contained in the tail gas are adsorbed by activated carbon; the waste activated carbon generated by adsorption is sent to a feed adding inlet of the waste incinerator for high-temperature degradation of the dioxins through combustion; the tail gas after thermal desorption disposal is sent to an upper part of the chimney to achieve clean emission; and the fly ash after thermal desorption disposal is discharged from a bottom of the heating device for further resource utilization.

As a further optional scheme of the present application, the condensed water generated by the heat pump system during the heat exchange process can also be sent to the water washing device for recycling as the water washing solution. The flow of the flue gas entering the fly ash disposal system is controlled by adjusting the opening degree of the partition device in the chimney according to operating conditions of the heat pump system and the water washing system, and excess flue gas is discharged from the chimney. Meanwhile, the generator set of the waste incineration power plant is configured to power the electrical equipment in the fly ash disposal system.

The present application can be modified based on the existing equipment structure of the waste incineration power plant, or the system layout design can be carried out when building a new waste incineration power plant.

By setting the waste activated carbon adding port at the material feeding point of the waste incinerator, the adsorbed waste activated carbon falls right above the flame when it is fed into the incinerator. On the one hand, it can assist in enhancing flame combustion, and on the other hand, it can achieve high-temperature degradation of dioxins through continuous incineration. The waste activated carbon adding port is connected to the waste activated carbon discharge outlet at the bottom of the activated carbon adsorption device through the waste activated carbon conveying channel, facilitating the discharge of waste activated carbon. The water washing solution preheating device is arranged in the heat exchange equipment such as the economizer. The latter enhances heat exchange efficiency by using U-shaped pipelines to coil inside the heat exchange equipment. By utilizing the heat of high-temperature flue gas to preheat the water washing solution, the electric energy consumption of each pump in the MVR system can be reduced. By supplying electricity generated by the waste incineration power plant to all the electrical equipment of the water washing system, the MVR system, and the dioxin removal system, it can reduce the dependence on external power supply and further reduce costs.

The sodium carbonate adding port is arranged at the upper part of the water washing device. Sodium carbonate is added to the water washing solution. By monitoring the pH change of the water washing solution, the removal situation of calcium ions in the water washing solution is determined. When the pH value of the water washing solution increases from 6-7 to 9-10, it can be considered that the calcium ions are basically removed. The cold flue gas inlet can be located at the lower part of the side of the water washing device and connected to the cold flue gas outlet of the heat pump system through a cold flue gas pipeline. On the one hand, the cold flue gas will not affect the carbonation efficiency of the fly ash, and on the other hand, the flue gas can be fully mixed with the suspension washed with water by entering from the lower part of the water washing device, thereby improving the capture and storage efficiency of carbon dioxide. After water washing, the carbon dioxide and acidic gases (such as hydrogen chloride and sulfur dioxide) contained in the original flue gas have been neutralized by carbonation reaction, so the cold flue gas can be directly discharged from the tail gas outlet. The condensed water inlet of the water washing device is connected to the condensed water discharge outlet of the MVR system and the condensed water discharge outlet of the heat pump system through a condensed water reuse main pipeline, an MVR condensed water discharge pipeline, and a heat pump condensed water discharge pipeline. Recycling condensate water can maximize the consumption of water resources, causing water resources to be recycled in the fly ash disposal system. If there are any excess water resources, they can be discharged from the condensed water discharge pipeline.

The heat pump system utilizes the sensible heat and latent heat in the hot flue gas to provide heat to the heating device in the dioxin removal system. The working period of the heating device is divided into a drying stage and a dioxin thermal desorption stage. In the drying stage, an air valve is opened to blow in air, a valve connected to the activated carbon adsorption device is closed, and a wet gas pipeline valve connected to the heat pump system is opened. The generated wet tail gas is connected to a hot flue gas pipeline through a wet tail gas pipeline, causing the wet tail gas to enter the heat pump system together with the hot flue gas, and achieving recovery and utilization of the latent heat. In the thermal desorption stage, a nitrogen valve is opened to blow in nitrogen, the wet gas pipeline valve is closed, and the valve connected to the activated carbon adsorption device is opened. The present application completes drying of the fly ash and thermal desorption of the dioxins in one device, greatly reducing equipment manufacturing and operating costs, and killing two birds with one stone.

Figure 2:
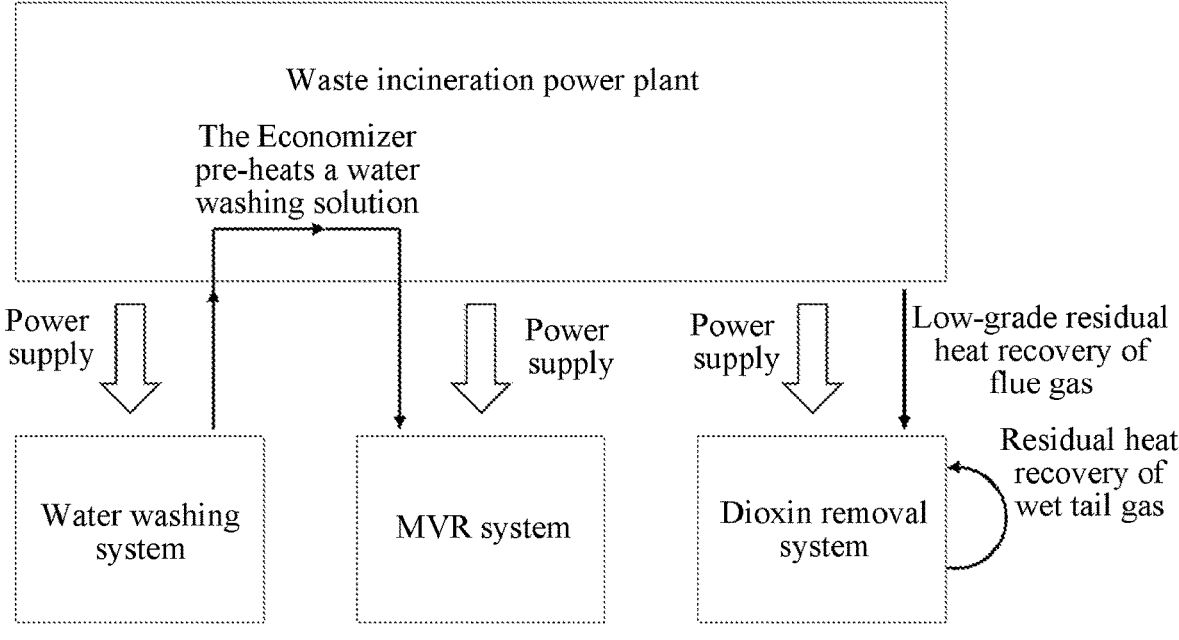
FIG. 2 is an energy flow diagram of the present application.

As shown in FIG. 2, the main energy flow of the present application is mainly as follows: the electricity generated by the waste incineration power plant provides energy for the water washing system, the MVR system, and the dioxin removal system, the heat exchange equipment such as the economizer provides heat for preheating the water washing solution, and the heat pump system in the dioxin removal system fully utilizes the low-grade residual heat of the flue gas and the wet tail gas to provide heat for drying of the fly ash washed with water and desorption of the dioxins.

Figure 3:
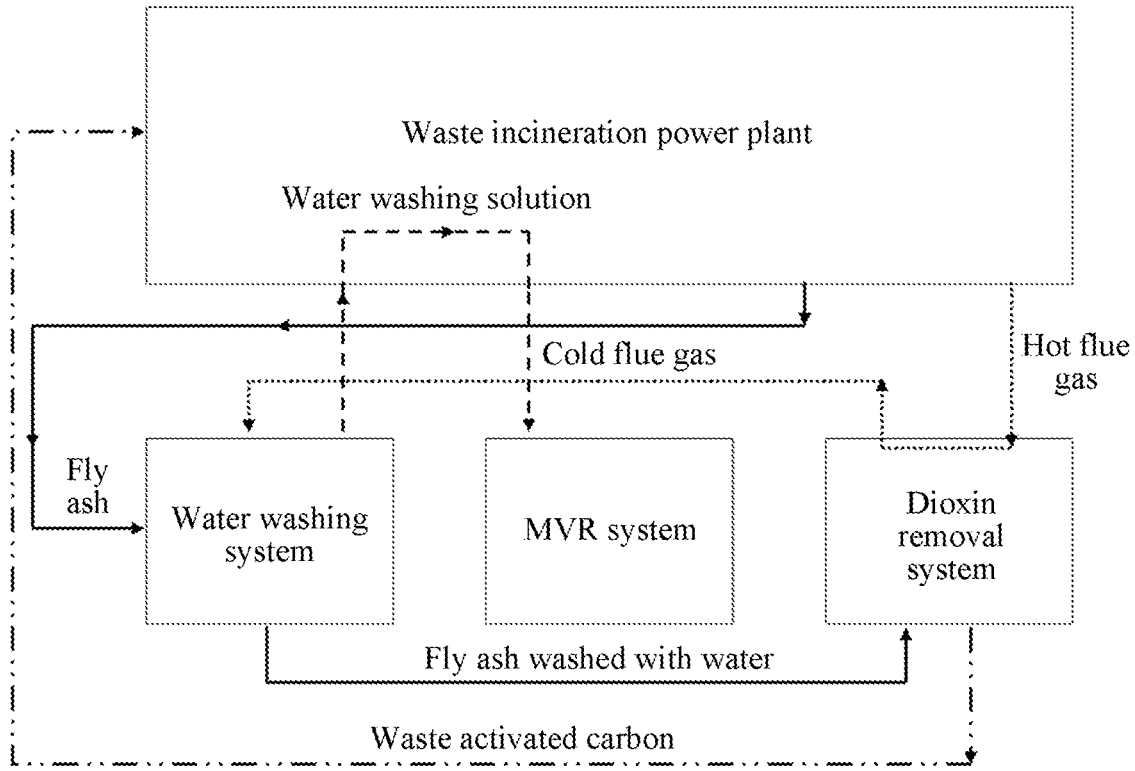
FIG. 3 is a key material flow diagram of the present application.

As shown in FIG. 3, the key material flow of the present application is as follows: (1) The original fly ash enters the water washing system to remove a large amount of chloride salts, and the fly ash washed with water enters the dioxin removal system for drying and dioxin desorption. (2) The activated carbon with a large amount of dioxins absorbed is transported to the waste incinerator and directly fed into the incinerator for combustion, which degrades the dioxins at high temperature. (3) The water washing solution first enters the heat exchange equipment for preheating, and then enters the MVR system for evaporation and crystallization to recover chloride salts. (4) The hot flue gas sent to the lower middle part of the chimney is introduced into the heat pump system to recover low-grade residual heat; and the cooled flue gas enters the water washing system, causing the carbon dioxide in the flue gas to undergo carbonation reaction with the fly ash, and capturing the carbon dioxide and efficiently solidifying the heavy metals. (5) The thermal desorption tail gas is then returned to the upper part of the chimney to achieve clean emission.

In the method for clean and low-carbon in-situ disposal of waste incineration fly ash, the main process and control parameters are as follows:

(1) The pH value of the water washing solution in the water washing device is detected, and when the pH is 6-7, the introduction of the cold flue gas is stopped. Then, the pH of the water washing solution is adjusted to 9-10 by adding sodium carbonate, and the resulting suspension washed with water is sent to the press filtering device.

(2) Through pressure filtration operation, the solid-liquid separation of the suspension washed with water is achieved. The solid part is the fly ash washed with water with a moisture content of 20%-30%, which is sent to the dioxin removal system through a water washing fly ash conveying channel. The separated water washing solution is at room temperature and sent to the heat exchange equipment such as the economizer for preheating.

(3) The preheated water washing solution has a temperature of 70-80° C. and is sent to the MVR system for multi-effect staged evaporation to prepare NaCl and KCl, and the condensed water enters a reuse pipeline and is reused for fly ash washing. The prepared NaCl meets the GB/T5462 industrial salt secondary standard, and KCl meets the GB/T6549 qualified product standard.

(4) In the dioxin removal system, the temperature during the drying stage is set to 100-110° C., and the drying time is set to 10-12 hours. The temperature for the thermal desorption stage of dioxins is set to 200-350° C., and the thermal desorption time is set to 1-2 hours. After activated carbon adsorption treatment, the adsorption rate of the dioxins in the tail gas reaches 99% or more. The waste activated carbon after adsorbing the dioxins is sent to the waste incinerator for combustion through the conveying channel to further degrade the dioxins at high temperature. The heavy metal leaching, chlorine content, and dioxin content of the treated fly ash all meet the "Technical Specification for Pollution Control of Fly Ash from Municipal Solid Waste Incineration" (HJ/T 1134-2020), and can be further used as raw materials for the preparation of cement, aggregates, ceramic particles, and other building materials.

The following are specific examples to further illustrate the application situation of the present application.

Example 1

A method for resource utilization of in-situ fly ash from waste incineration power plants includes the following steps:

Step 1: The original fly ash from the bag dust collector is sent to the water washing device in the water washing system through the original fly ash conveying channel. Meanwhile, the cold flue gas exported from the heat pump system is introduced into the water washing device. The pH of the water washing solution is detected. When the pH is 6, the introduction of the cold flue gas is stopped. The pH of the water washing solution is adjusted to 9 by adding sodium carbonate, and then the water washing suspension is pour into the press filtering device.

Step 2: Through pressure filtration operation, the solid-liquid separation of the suspension washed with water is achieved. The solid part is the fly ash washed with water with a moisture content of 20%, which is sent to the dioxin removal system through the water washing fly ash conveying channel. The water washing solution enters a washing solution preheating system in the economizer.

Step 3: The preheated washing solution reaches 70° C. and enters the MVR system through a NaCl and KCl. The condensed water enters the reuse pipeline and is reused for fly ash washing. The final prepared NaCl meets the GB/T5462 industrial salt level secondary standard, and KCl meets the GB/T6549 qualified product standard.

Step 4: In the dioxin removal system, the fly ash washed with water is first dried at a temperature of 100° C. for 10 hours during the drying stage. The heat pump system provides heat to the drying stage by recovering sensible heat and latent heat from the flue gas. Air is blown into the dioxin removal system. The wet tail gas enters the heat pump system. The latent heat of water vapor in the tail gas is recovered. Secondly, during the thermal desorption stage of the dioxins, the temperature is set to 200° C. and the thermal desorption time is set to 1 hour. Nitrogen is blown into the dioxin removal system, and the thermal desorption tail gas passes through the activated carbon adsorption device. Dioxins are adsorbed by the activated carbon at a rate of 99% or more. The waste activated carbon after adsorbing the dioxins is sent to the waste incinerator for combustion through the conveying channel to further degrade the dioxins at high temperature. The heavy metal leaching, chlorine content, and dioxin content of the treated fly ash all meet the "Technical Specification for Pollution Control of Fly Ash from Municipal Solid Waste Incineration" (HJ/T 1134-2020), and can be further used as raw materials for the preparation of cement, aggregates, ceramic particles, etc.

Example 2

A method for resource utilization of in-situ fly ash from waste incineration power plants includes the following steps:

Step 1: The original fly ash from the bag dust collector is sent to the water washing device in the water washing system through the original fly ash conveying channel. Meanwhile, the cold flue gas exported from the heat pump system is introduced into the water washing device. The pH of the water washing solution is detected. When the pH is 6.5, the introduction of the cold flue gas is stopped. The pH of the water washing solution is adjusted to 9.5 by adding sodium carbonate, and then the water washing suspension is pour into the press filtering device.

Step 2: Through pressure filtration operation, the solid-liquid separation of the suspension washed with water is achieved. The solid part is the fly ash washed with water with a moisture content of 25%, which is sent to the dioxin removal system through the water washing fly ash conveying channel. The water washing solution enters a washing solution preheating system in the economizer.

Step 3: The preheated washing solution reaches 75° C. and enters the MVR system through a NaCl and KCl. The condensed water enters the reuse pipeline and is reused for fly ash washing. The final prepared NaCl meets the GB/T5462 industrial salt level secondary standard, and KCl meets the GB/T6549 qualified product standard.

Step 4: In the dioxin removal system, the fly ash washed with water is first dried at a temperature of 105° C. for 11 hours during the drying state. The heat pump system provides heat to the drying stage by recovering sensible heat and latent heat from the flue gas. Air is blown into the dioxin removal system. The wet tail gas enters the heat pump system. The latent heat of water vapor in the tail gas is recovered. Secondly, during the thermal desorption stage of the dioxins, the temperature is set to 300° C. and the thermal desorption time is set to 1.5 hours. Nitrogen is blown into the dioxin removal system, and the thermal desorption tail gas passes through the activated carbon adsorption device. Dioxins are adsorbed by the activated carbon at a rate of 99% or more. The waste activated carbon after adsorbing the dioxins is sent to the waste incinerator for combustion through the conveying channel to further degrade the dioxins at high temperature. The heavy metal leaching, chlorine content, and dioxin content of the treated fly ash all meet the "Technical Specification for Pollution Control of Fly Ash from Municipal Solid Waste Incineration" (HJ/T 1134-2020), and can be further used as raw materials for the preparation of cement, aggregates, ceramic particles, etc.

Example 3

A method for resource utilization of in-situ fly ash from waste incineration power plants includes the following steps:

Step 1: The original fly ash from the bag dust collector is sent to the water washing device in the water washing system through the original fly ash conveying channel. Meanwhile, the cold flue gas exported from the heat pump system is introduced into the water washing device. The pH of the water washing solution is detected. When the pH is 7, the introduction of the cold flue gas is stopped. The pH of the water washing solution is adjusted to 10 by adding sodium carbonate, and then the water washing suspension is pour into the press filtering device.

Step 2: Through pressure filtration operation, the solid-liquid separation of the suspension washed with water is achieved. The solid part is the fly ash washed with water with a moisture content of 30%, which is sent to the dioxin removal system through the water washing fly ash conveying channel. The water washing solution enters a washing solution preheating system in the economizer.

Step 3: The preheated washing solution reaches 80° C. and enters the MVR system through a NaCl and KCl. The condensed water enters the reuse pipeline and is reused for fly ash washing. The final prepared NaCl meets the GB/T5462 industrial salt level secondary standard, and KCl meets the GB/T6549 qualified product standard.

Step 4: In the dioxin removal system, the fly ash washed with water is first dried at a temperature of 110° C. for 12 hours during the drying stage. The heat pump system provides heat to the drying stage by recovering sensible heat and latent heat from the flue gas. Air is blown into the dioxin removal system. The wet tail gas enters the heat pump system. The latent heat of water vapor in the tail gas is recovered. Secondly, during the thermal desorption stage of the dioxins, the temperature is set to 350° C. and the thermal desorption time is set to 2 hours. Nitrogen is blown into the dioxin removal system, and the thermal desorption tail gas passes through the activated carbon adsorption device. Dioxins are adsorbed by the activated carbon at a rate of 99% or more. The waste activated carbon after adsorbing the dioxins is sent to the waste incinerator for combustion through the conveying channel to further degrade the dioxins at high temperature. The heavy metal leaching, chlorine content, and dioxin content of the treated fly ash all meet the "Technical Specification for Pollution Control of Fly Ash from Municipal Solid Waste Incineration" (HJ/T 1134-2020), and can be further used as raw materials for the preparation of cement, aggregates, ceramic particles, etc.

The system and method for resource utilization of in-situ fly ash from waste incineration power plants provided by the present application have the advantages of being low-carbon, energy-saving, water-saving, and environmentally friendly. The waste incineration fly ash disposal process is effectively coupled with the waste incineration power plant, the electricity emitted by the waste incineration power plant, the thermal energy of the economizer, and the residual heat of flue gas are utilized to provide energy to the fly ash disposal equipment. The energy conservation reaches 80% or more on the basis of the energy consumption of original equipment operation, the condensed water is fully recycled from the MVR system and the heat pump system, greatly reducing water resource consumption, and saving water by 90% or more. A scientific and effective way has been established for the harmless resource utilization of the fly ash. The fly ash is sequentially washed with water, carbonated, dried, and subjected to dioxin removal/adsorption to obtain fly ash solids that meet resource utilization standards. Secondly, the salt in the water washing solution, which can be used as a resource, is recycled and sold as a commercial product. Toxic by-products, i.e., activated carbon which adsorbs dioxins, are sprayed into the incinerator for high-temperature combustion to degrade the dioxins. The ultimate goal is to achieve water saving and energy saving throughout the entire process of fly ash disposal, low-carbon emission reduction, environmental friendliness and no three wastes, reducing the cost of the fly ash disposal in the waste incineration plants by 30%-50% or more. The renovation of various pipeline equipment involved is carried out on the basis of the original waste incineration power plant, and the renovation and operation costs are low. It is an in-situ disposal technology for fly ash with good commercial application prospects.

Obviously, those skilled in the art can make various subsequent applications, supplements, modifications, and variations of the present application without departing from the spirit and scope of the present application. If the various applications, supplements, modifications, and variations based on the present application fall within the scope of the claims and their equivalent technologies, the present application is also intended to include these applications, supplements, modifications, and variations.

What is claimed is:

1. A method for clean and low-carbon in-situ disposal of waste incineration fly ash, using a system for clean and low-carbon in-situ disposal of waste incineration fly ash comprising a waste incineration system and a fly ash disposal system, wherein the fly ash disposal system is coupled with the waste incineration system of a waste incineration power plant in-situ, the waste incineration fly ash and a flue gas are disposed nearby, and flue gas residual heat and self-generated electricity of the waste incineration power plant are used for providing energy demand and in-situ energy supply for the clean and low-carbon in-situ disposal of waste incineration fly ash;

wherein the waste incineration system comprises a waste incinerator, a flue gas purification system, a bag dust collector, and a chimney connected sequentially by a flue; heat exchange equipment is arranged in a flue for recovering heat energy from flue gas; a waste activated carbon adding port is arranged at a front end of the waste incinerator, an original fly ash outlet is arranged at a bottom of the bag dust collector, and a hot flue gas outlet is arranged at a lower middle part of the chimney;

wherein the fly ash disposal system comprises a water washing system, a mechanical vapor recompression system, and a dioxin removal system;

wherein the water washing system comprises a water washing device and a press filtering device; the water washing device is provided with an original fly ash inlet, a cold flue gas inlet, a tail gas outlet, a sodium carbonate adding port, and a condensed water inlet; the water washing device is connected to the press filtering device, and the press filtering device is provided with a water washing fly ash outlet and a cold water washing solution outlet;

wherein the dioxin removal system comprises a heating device, an activated carbon adsorption device, and a heat pump system; the heating device is provided with an air and nitrogen inlet, a water washing fly ash inlet, a wet tail gas outlet, a to-be-desorbed tail gas outlet, and a treated fly ash outlet, and the to-be-desorbed tail gas outlet is connected to the activated carbon adsorption device; the activated carbon adsorption device is internally filled with activated carbon and is provided with a waste activated carbon discharge outlet and a thermal desorption tail gas outlet; the heat pump system is configured to provide heat to the heating device and is provided with a hot flue gas inlet and a cold flue gas outlet, and the wet tail gas outlet of the heating device is connected to the hot flue gas inlet;

wherein the mechanical vapor recompression system comprises a crystallizer, a heater, a vapor compressor, a circulating pump, a centrifuge, and a condensed water pump, and is provided with a hot water washing solution inlet, a condensed water discharge outlet, and a salt crystal outlet;

wherein the original fly ash outlet of the bag dust collector is connected to the original fly ash inlet of the water washing device through a conveying channel, the water washing fly ash outlet of the press filtering device is connected to the water washing fly ash inlet of the heating device through a conveying channel, and the waste activated carbon discharge outlet of the activated carbon adsorption device is connected to the waste activated carbon adding port of the waste incinerator through a conveying channel; the hot flue gas outlet of the chimney is connected to the hot flue gas inlet of the heat pump system through a pipeline, and the cold flue gas outlet of the heat pump system is connected to the cold flue gas inlet of the water washing device through a pipeline; the cold water washing solution outlet of the water washing device is connected to heat exchange equipment in the flue through a pipeline, the heat exchange equipment is connected to the hot water washing solution inlet of the mechanical vapor recompression system through a pipeline after heat exchange; the condensed water discharge outlet of the mechanical vapor recompression system is connected to the condensed water inlet of the water washing system through a pipeline;

wherein the method comprises (1) sending original fly ash collected by the bag dust collector to the water washing device of the water washing system, and introducing cold flue gas that has been heat exchanged by the heat pump system, wherein alkaline substances and heavy metals in the original fly ash undergo carbonation reaction with carbon dioxide in the flue gas; when a pH value of a water washing solution is less than 7, stopping introducing the flue gas and adding sodium carbonate to adjust the pH value to between 9 and 10; and the cold flue gas is directly discharged from the tail gas outlet of the water washing device after the carbonation reaction;

(2) sending a suspension obtained by water washing to the press filtering device for press filtration to achieve solid-liquid separation, wherein the water washing solution of (1) is sent to the heat exchange equipment of the waste incineration system for preheating, and a solid waste incineration fly ash washed with water is sent to the heating device of the dioxin removal system for dioxin removal treatment;

(3) enabling a pre-heated water washing solution having a temperature of 70-80° C. to enter the mechanical vapor recompression system and undergo multi-effect staged evaporation to obtain salt crystals and condensed water, wherein the salt crystals are recycled for resource utilization, while condensed water is sent to the water washing device for fly ash washing; and (4) enabling the original fly ash washed with water to undergo drying and thermal desorption in the dioxin removal system, where during the drying, a temperature in the heating device is controlled at 100-110° C. for 10-12 hours; at this time, the heat pump system introduces hot flue gas from the chimney and achieves heat supply by recovering sensible heat and latent heat contained in the flue gas; meanwhile, wet tail gas generated during a drying process is sent to the heat pump system by blowing in air to further recover latent heat of water vapor; the treated wet tail gas is sent to the inlet of the heat pump system, and mixed with the hot flue gas for heat supply;

wherein during the thermal desorption, a temperature in the heating device is controlled at 200-350° C. for 1-2 hours; at this time, a thermal desorption tail gas generated during the drying process is sent to the activated carbon adsorption device by blowing in nitrogen, dioxins contained in the thermal desorption tail gas are adsorbed by activated carbon; a waste activated carbon generated by adsorption is sent to a feed adding inlet of the waste incinerator for high-temperature degradation of the dioxins through combustion; a tail gas after thermal desorption disposal is sent to an upper part of the chimney to achieve clean emission; and the original fly ash after thermal desorption disposal is discharged from a bottom of the heating device for further resource utilization.

2. The method according to claim 1, wherein the waste incineration system is located in a waste incineration power plant, the heat exchange equipment in the flue is connected to a steam turbine through a steam pipeline, the steam turbine is connected to a generator set; and the generator set is connected to electrical equipment in the fly ash disposal system through a cable, and uses self-generation of the waste incineration power plant to achieve power supply.

3. The method according to claim 1, wherein the heat pump system is further provided with a condensed water discharge outlet, and the condensed water discharge outlet of the heat pump system is connected to the cold water washing solution outlet of the water washing device through a pipeline.

4. The method according to claim 1, wherein the chimney is provided with a partition device that can adjust an opening degree, the hot flue gas outlet of the chimney is located below the partition device; a thermal desorption tail gas inlet is arranged above the partition device, and is connected to the thermal desorption tail gas outlet of the activated carbon adsorption device through a pipeline for achieving clean tail gas emission.

5. The method according to claim 1, wherein the heat exchange equipment is at least one of a superheater, an economizer, or an air preheater; and a water washing solution preheating device is arranged inside the heat exchange equipment, and is separately connected to the cold water washing solution outlet of the water washing device and the hot water washing solution inlet of the mechanical vapor recompression system through pipelines.

6. The method according to claim 1, wherein the condensed water discharge outlet of the mechanical vapor recompression system is also connected to a condensed water discharge pipeline.

7. The method according to claim 1, wherein the condensed water generated by the heat pump system during heat exchange is sent to the water washing device for recycling as a water washing solution.

8. The method according to claim 1, wherein a flow of the flue gas entering the fly ash disposal system is controlled by adjusting an opening degree of a partition device in the chimney according to operating conditions of the heat pump system and the water washing system, and excess flue gas is discharged from the chimney.

9. The method according to claim 1, wherein a generator set of the waste incineration power plant is configured to power the electrical equipment in the fly ash disposal system.

* * * * *